Patented Oct. 10, 1944

2,359,826

UNITED STATES PATENT OFFICE 2,359,826

DEHYDROABIETIC ACID DERIVATIVES

William P. Campbell, Newark, Del., assignor to Hercules Powder Company, Wilmington, Del., a corporation of Delaware No Drawing. Application August 11, 1942, Serial No. 454,458

9 Claims. (Cl. 260—97)

This invention relates to new compositions of matter. More particularly it relates to derivatives of dehydroabietic acid containing substituted hydroxyl groups in the aromatic nucleus.

The production of a monohydroxy dehydroabietic acid and its methyl ester have been described in the literature. In my copending application, Serial No. 448,868, filed June 27, 1942, I have described an improved method for producing hydroxylated dehydroabietic acid compounds containing the hydrocarbon nucleus of dehydroabietic acid involving heating a halogenated dehydroabietic acid compound with an alkali metal hydroxide or alkaline earth metal hydroxide.

Now, in accordance with this invention, I have discovered that a new class of dehydroabietic acid derivatives may be produced from the hydroxylated dehydroabietic acid and hydroxylated dehydroabietic acid compounds by substitution of the hydrogen of the hydroxyl group or groups with an alkyl, an aryl or an acyl group. Thus, the new compositions may be expressed by the following general formula:

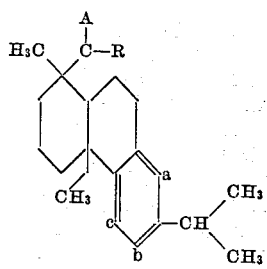

wherein A is a bivalent element or group such as O, S, H$_2$, NX, where X is hydrogen or a monovalent organic radical; R is a monovalent element or group such as OH, H, SH, O-metal, O—NH$_4$, halogen, OSO$_3$H, OSO$_3$-metal, OX, SX, NXX, where X is hydrogen or a monovalent organic radical; $a$ and/or $b$ and/or $c$ are either hydrogen, O-alkyl, O-aryl or O-acyl, and no more than two of $a$, $b$ and $c$ are hydrogen.

Thus, in general, the new derivatives of dehydroabietic acid which are prepared in accordance with this invention may or may not be substituted in the carboxyl group and will be substituted in the aromatic ring of the dehydroabietic acid, or compound containing the hydrocarbon nucleus of dehydroabietic acid, in one or more of the three possible positions with an O-alkyl, an O-aryl or an O-acyl group.

The following examples illustrate the production of the new derivatives of dehydroabietic acid described in accordance with this invention. The parts expressed in the examples represent parts by weight unless otherwise indicated.

Example 1

Five parts of a methyl ester of monohydroxy dehydroabietic acid were refluxed for one hour in dry ether with a solution of 1.18 parts of methyl magnesium chloride in 16.4 parts of dry ether. A solution of 13.3 parts of freshly distilled dimethyl sulfate in dry ether was then added slowly and the refluxing continued for 18 hours. The excess dimethyl sulfate was then decomposed by addition of alkali, the ether solution evaporated and the crude methyl ester of methoxy dehydroabietic acid obtained also crystallized from aqueous ethyl alcohol. After recrystallization from the same solvent, 3.2 parts of the purified product in broad flakes were obtained. This represented a yield of 61%. The purified product melted at 65.5 to 66.5°, had a specific rotation at 25° C. of +87° (1.6% in ethyl alcohol), and a methoxyl value of 17.82% (theory 18.01%).

Example 2

A solution of 9.33 parts of the methyl ester of methoxy dehydroabietic acid obtained as in Example 1 in 72 parts of normal butyl alcohol and 4 parts of water was refluxed for 3 hours with 10 parts of sodium hydroxide. The solvent was then removed by steam distillation, the solution acidified, and the precipitate of crude methoxy dehydroabietic acid which formed dissolved in ether. To purify the product the acid was extracted from the ether solution with 1% sodium hydroxide solution, and the acid precipitated by addition of hydrochloric acid. The product was then crystallized from boiling ethyl alcohol solution by addition of water. The yield of the purified methoxy dehydroabietic acid was 8.45 parts (94% of theory). It had a melting point of 202.5 to 203.5° C. and a neutral equivalent of 326.5 (theory 330.4).

Example 3

To a solution of 8.45 parts of the methoxy dehydroabietic acid obtained as in Example 2 dissolved in 21 parts of dry ether, 3.3 parts of thionyl chloride and .05 part of pyridine were added. After allowing the solution to stand for four hours at room temperature, the solution was washed rapidly with dilute sodium hydroxide solution until the washings remained alkaline;

then with water, and then dried over sodium sulfate. The ether was then evaporated from the solution and the crude methoxy dehydroabietoyl chloride was purified by heating in vacuo at 100° C. for 48 hours.

*Example 4*

A solution of 7 parts of the methoxy dehydroabietoyl chloride prepared as in Example 3 dissolved in 100 parts of dry xylene was submitted to a Rosenmund reduction with 2 parts of 10% palladium-barium sulfate catalyst by first flushing out the vessel containing the acid chloride and the catalyst with nitrogen and then heating the solution to the boiling point and passing in a stream of hydrogen which had been dried by passage through sulfuric acid. The reduction proceeded rapidly and was interrupted after 50 minutes when 81% of the calculated amount of hydrogen chloride had been evolved. The solution was then filtered, steam distilled, and the solid residue taken up in ether. The ether solution was washed, dried, and the crude methoxy dehydroabietinal crystallized from an ether-hexane mixture. The yield was 4.5 parts, representing 56% of the theoretical. After recrystallization from an ether-hexane solvent, the product consisted of small, rectangular plates having a melting point of 137 to 138° C., and a specific rotation at 28° C. of +90.3° (1% solution in ethyl alcohol). The methoxy dehydroabietinal was converted to its semicarbazone by treatment with semicarbizide acetate, the semicarbazone being an amorphous white solid having a melting point of 236.5° C.

*Example 5*

Acetoxydehydroabietane was prepared by refluxing monohydroxy dehydroabietane for 2 hours with acetic anhydride containing sodium acetate. The solution was then made alkaline and extracted with ether, the ether solution washed, dried and the ether evaporated. The residue was sublimed at 1 mm. pressure and allowed to stand for several hours whereupon the sublimed product partially crystallized. The remainder of the sublimate was then crystallized from dilute methyl alcohol and recrystallized from petroleum ether. The purified acetoxydehydroabietane had a melting point of 80–81° C., a specific rotation at 30° C. of +66.3° (4% in ethyl alcohol) and an index of refraction at 61° C. of 1.5186.

The new derivatives of dehydroabietic acid containing the substituted hydroxy group or groups in the aromatic nucleus may, as is shown in the examples, be prepared in a variety of ways. The hydroxylated dehydroabietic acid or dehydroabietic acid compounds provide a desirable starting point for the preparation of the new derivatives. A suitable method for preparing the hydroxy derivatives useful as starting materials is described in my copending application, Serial No. 448,868, referred to above.

The new derivatives of dehydroabietic acid described in accordance with this invention will usually contain either 1 or 2 of the O-alkyl, O-aryl or O-acyl groups in the aromatic ring of the dehydroabietic acid nucleus. While a third such substituent group may be introduced, such products can only be prepared with great difficulty due to the difficulty of introducing more than two hydroxyl groups into the aromatic nucleus. The derivatives containing one of the said groups as substituents in the aromatic nucleus are particularly interesting for commercial utilization since they can be prepared easily.

The new dehydroabietic derivatives which have been described in accordance with this invention are useful for a variety of purposes depending on the particular compound involved. Many of them are useful as intermediates for the preparation of other valuable compounds while others are useful as plasticizers for film-forming materials, in greases, insecticides, etc.

What I claim and desire to protect by Letters Patent is:

1. As a new composition of matter, methoxydehydroabietic acid.

2. As a new composition of matter, acetoxydehydroabietane.

3. As a new composition of matter, a substituted hydroxylated derivative of a dehydroabietic acid compound selected from the group consisting of dehydroabietic acid, dehydroabietic acid esters, dehydroabietic acid halides, dehydroabietane and dehydroabietinal, in which the hydroxyl group is substituted by a substituent selected from the group consisting of O-alkyl, O-aryl and O-acyl.

4. As a new composition of matter, a substituted hydroxylated dehydroabietic acid, in which the hydroxy group is substituted by a substituent selected from the group consisting of O-alkyl, O-aryl and O-acyl.

5. As a new composition of matter, a substituted hydroxylated derivative of a dehydroabietic acid ester, in which the hydroxyl group is substituted by a substituent selected from the group consisting of O-alkyl, O-aryl and O-acyl.

6. As a new composition of matter, a substituted hydroxylated derivative of dehydroabietane, in which the hydroxyl group is substituted by a substituent selected from the group consisting of O-alkyl, O-aryl and O-acyl.

7. As a new composition of matter, a substituted hydroxylated dehydroabietic acid, in which the hydroxyl group is substituted by an O-alkyl group.

8. As a new composition of matter, a substituted hydroxylated derivative of a dehydroabietic acid ester, in which the hydroxyl group is substituted by an O-aryl group.

9. As a new composition of matter, a substituted hydroxylated derivative of dehydroabietane, in which the hydroxyl group is substituted by an O-acyl group.

WILLIAM P. CAMPBELL.